US009113133B2

(12) United States Patent
Gifford

(10) Patent No.: US 9,113,133 B2
(45) Date of Patent: Aug. 18, 2015

(54) METHOD AND SYSTEM FOR DETECTING A VERTICAL CUT IN A VIDEO SIGNAL FOR THE PURPOSE OF TIME ALTERATION

(71) Applicant: Prime Image Delaware, Inc., Chalfont, PA (US)

(72) Inventor: Christopher Scott Gifford, Nipomo, CA (US)

(73) Assignee: Prime Image Delaware, Inc., Chalfont, PA (US)

(*) Notice: Subject to any disclaimer, the term of this patent is extended or adjusted under 35 U.S.C. 154(b) by 374 days.

(21) Appl. No.: 13/755,986

(22) Filed: Jan. 31, 2013

(65) Prior Publication Data

US 2013/0279884 A1  Oct. 24, 2013

Related U.S. Application Data

(63) Continuation of application No. 61/592,849, filed on Jan. 31, 2012.

(51) Int. Cl.
*H04N 5/21* (2006.01)
*H04N 9/87* (2006.01)
*G11B 27/28* (2006.01)
*H04N 5/14* (2006.01)
*H04N 5/91* (2006.01)

(52) U.S. Cl.
CPC .............. *H04N 9/87* (2013.01); *G11B 27/28* (2013.01); *H04N 5/147* (2013.01); *H04N 5/91* (2013.01)

(58) Field of Classification Search
CPC ........................................................ H04N 5/21
USPC .......................................................... 348/701
See application file for complete search history.

(56) References Cited

U.S. PATENT DOCUMENTS

| 4,464,784 | A | 8/1984 | Agnello |
| 4,757,540 | A | 7/1988 | Davis |
| 5,023,888 | A | 6/1991 | Bayston |
| 5,627,581 | A | 5/1997 | Kondo |
| 5,995,153 | A | 11/1999 | Moeller et al. |
| 6,026,232 | A | 2/2000 | Yogeshwar et al. |
| 6,178,317 | B1 | 1/2001 | Kroeger et al. |
| 6,456,337 | B1 * | 9/2002 | Kobayashi et al. ........... 348/701 |
| 6,928,233 | B1 * | 8/2005 | Walker et al. ................. 386/241 |
| 7,092,774 | B1 | 8/2006 | Gifford et al. |
| 8,340,472 | B2 * | 12/2012 | Yamada et al. ............... 382/300 |
| 2007/0279532 | A1 * | 12/2007 | Yamauchi ...................... 348/701 |

* cited by examiner

*Primary Examiner* — Jefferey Harold
*Assistant Examiner* — Sihar Karwan
(74) *Attorney, Agent, or Firm* — Dergosits & Noah, LLP

(57) ABSTRACT

A circuit and method for detecting a vertical cut in a sequence of digital video images. Each pixel of a video frame is filtered then compared to a filter threshold. If the threshold is met, a current pixel bit is set as active. A delayed pixel bit is generated from the current pixel bit, and a changed pixel bit is generated if either but not both of the current pixel bit and the delayed pixel bit is active. Active pixels are counted. The count of active pixels in the current image and the count of active pixels in the delayed image are used to weight the active pixel count of the changed image. The counts are used to determine a change value for the current image. The change value may be a large positive value, a large negative value, or neither. A predefined pattern of the change values over a sequence of frames indicates a vertical cut in the sequence.

30 Claims, 8 Drawing Sheets

METHOD AND SYSTEM FOR DETECTING A VERTICAL CUT IN A VIDEO SIGNAL FOR THE PURPOSE OF TIME ALTERATION

CROSS REFERENCE

This disclosure claims priority from U.S. Provisional Patent App. No. 61/592,849 entitled Method and System for Analyzing and Detecting Vertical Cuts in a Video Signal for the Purpose of Time Alteration of a Program's Runtime, filed Jan. 31, 2012, and incorporated herein by reference.

TECHNICAL FIELD

The present invention relates to circuits and methods for altering the running time of a digital video program signal, and in particular, to circuits and methods for analyzing a sequence of video images in order to detect a vertical cut transition from one video segment to the next.

BACKGROUND

A digital audio/video program is a collection of various audio and video segments arranged in a linear sequence. The method used to join each segment together is called a transition. Several common video transition methods are known, such as vertical cuts, wipes, dissolves, fades-to-black and fades-from-black.

A "cut" is an abrupt change from one scene to another and is the simplest and most basic transition method. The term "cut" comes from the process of film editing where two segments of film were physically cut and then spliced together to produce an instant transition. In modern digital video, the term "vertical cut" is used to indicate the transition that occurs at the vertical boundary between images of the video signal.

Time alteration of a video program is the process of adding or removing individual frames of video to lengthen or shorten the duration of the program. The challenge of time alteration is finding locations within the program to add or remove frames without the viewer noticing. The abrupt change of a vertical cut provides the perfect opportunity to remove or duplicate one or more video frames without any noticeable artifact.

Techniques for time alteration of the corollary audio signal are known to those skilled in the art. For example, commonly-assigned U.S. Pat. No. 7,092,774, entitled Multi-Channel Audi Processing System with Real-time Program Duration Alteration, incorporated herein by reference, discloses techniques operable in real-time to alter the running time of a program signal, and in particular, to techniques particularly suited to operate on multi-channel audio program signals.

It would be desirable to have corresponding methods for analyzing the video signal in order to concurrently alter the run time of both the audio and video signals in a digital audio/video program. In order to effectively do so for video signals, an effective method to detect vertical cuts in the video signal is required.

DETAILED DESCRIPTION

1. Overview

Figure 1:
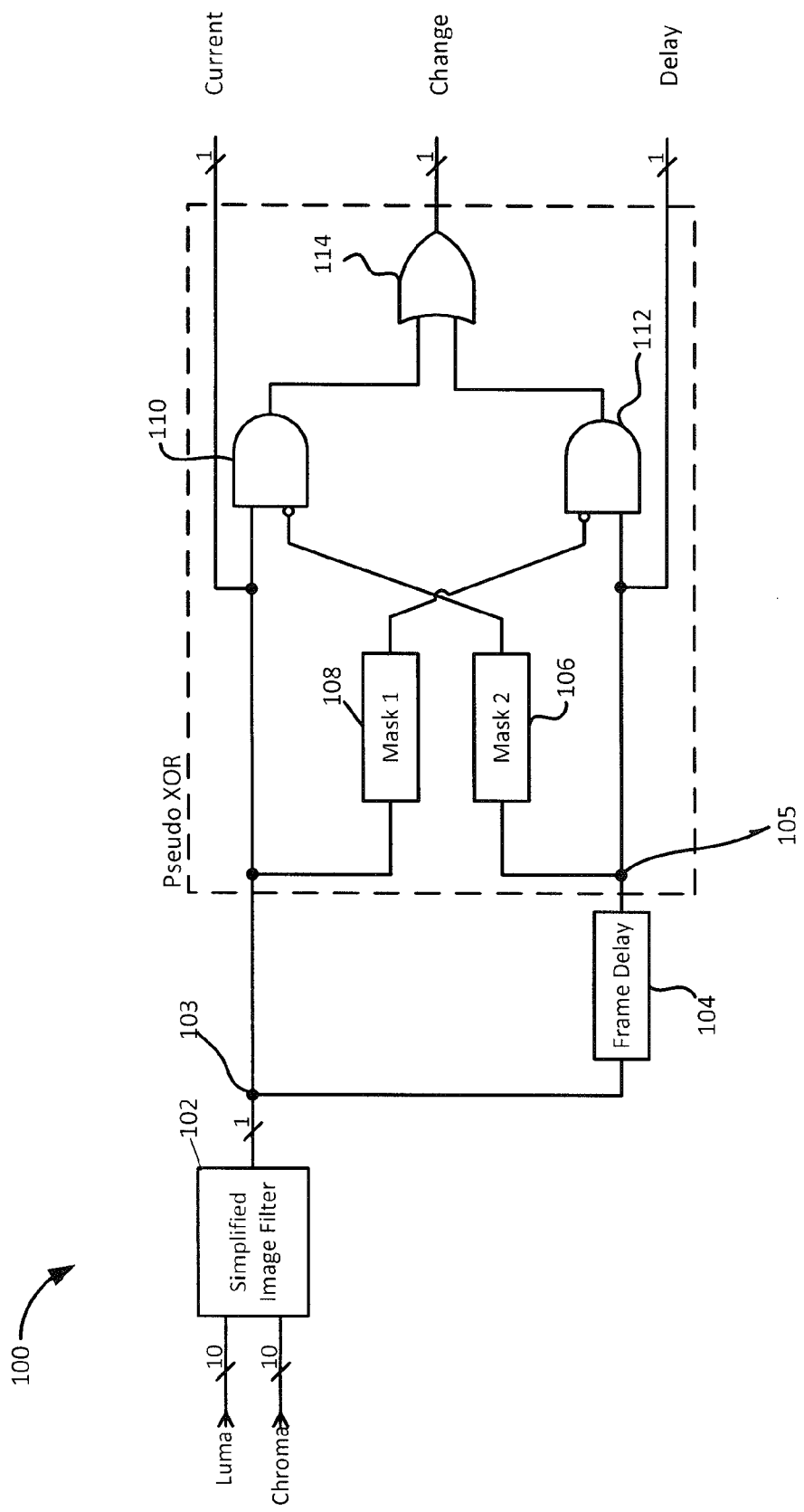
FIG. 1 is a block diagram illustrating a circuit for conversion of a multi-bit pixel to a single-bit representation.

Circuits and methods are described for detecting a vertical cut in a sequence of video images. The detection circuits and techniques disclosed herein are optimized for the purpose of analyzing and positively detecting a vertical cut in the video sequence for the purpose of altering the run time of a video program. These circuits and techniques are required to process all forms of video on-the-fly, including progressive, interlaced, and those produced by telecine conversion to meet the demands of live real-time video broadcast. Digital video program material may be taken into the signal processing system in either uncompressed video (Serial Digital Interface—SDI), or an encoded file. Time altered program segments may be output from the signal processing system in either SDI video, or an encoded file.

Each pixel within a video frame is filtered to remove pixel values that are the same as neighboring pixels, for example, common brightness and color values. The filtered pixel is then compared to a filter threshold, and if the threshold is met, a single indicator bit ("current pixel bit") is set to an active state. The result is a simplified frame where each single bit pixel is active only where picture detail is present.

A second indicator bit, delayed by one frame ("delayed pixel bit") is generated from the current pixel bit to compare motion between frames (current and delayed images). A masking technique is used around the current and delayed pixel bits combined with a XOR function to filter out slight changes in motion. A third indicator bit ("changed pixel bit") is generated if either but not both of the current pixel bit and the delayed pixel bit is active. All active pixels in the current image, the delayed image, and the changed image are counted. If the count of active pixels in the current image is similar to the count of active pixels in the delayed image, then a low weighting factor is applied to the active pixel count of the changed image. If the count of active pixels in the current image is disparate from the count of active pixels in the delayed image, then a high weighting factor is applied to the active pixel count of the changed image.

The weighted active pixel count of the changed image is divided by the maximum active pixel count of either the current or delayed images to yield a percent change value for the current image. The change value is compared to a large positive threshold, and a "positive" change bit is set if change value is greater than the large positive threshold. The change value is also compared to a large negative threshold, and a "negative" change bit is set if the change value is less than the large negative threshold. If the change value is not larger than the positive threshold and not smaller than the negative threshold, then a "none" change bit is set indicating a negligible change in the current image.

Each pixel in a number of sequential frames is processed, and if the pattern of change bits meets a predefined pattern, then a vertical cut has been detected.

2. Video Formats

The run time of a video program may be altered by adding or removing individual frames to lengthen or shorten the duration of the video program. The challenge associated with time alteration schemes is to find locations within the video program to add or remove frames without the viewer noticing. The abrupt change of a vertical cut provides the perfect opportunity to remove or duplicate one or more video frames without any noticeable artifact.

However, vertical cuts can be difficult to detect in a real-time video signal. Many known methods produce less than optimal results since they were originally designed for legacy video formats, and may rely upon operating conditions that no longer exist. The variety of video formats encountered today make the detection of vertical cuts even more difficult.

Before the introduction of High Definition (HD) video, most video signals typically used an interlaced video format in which two fields are required to make one complete frame, e.g., an odd field having the odd-numbered horizontal lines of the frame, and an even field having the even-numbered horizontal lines of the frame. It was generally understood that all vertical cuts should occur at the vertical boundary preceding the first field. However, the introduction of HD video allows video programs to be edited in progressive (non-interlaced) formats such as 720p and 1080p. The result is that when such programs are later converted to interlaced video, the vertical cuts may occur on either or both of the odd and even field boundaries.

Some video media, such as film, provide video content that was created at 24 frames per second (Fps). In the United States and other countries where the television standard is 29.97 Fps, the 24 Fps content is converted to 29.97 Fps by a telecine process. This method converts every four frames into five frames by adding an extra video field to the odd frames (3 field, 2 field, 3field, 2 field). This 3:2:3:2 sequence may not be consistent when content is edited after conversion to 29.97 Fps, and such a sequence is referred to as a broken sequence. The sequence can be further broken when it is combined with true video content and graphics created at 29.97 Fps.

All of the various types of video formats must be considered when employing techniques to look for a vertical cut. It is known that by comparing adjacent video frames, a signal can be produced representing the change in the picture, where this change may be due to either motion in the video segment, a telecine sequence, or a vertical cut. However, the detection scheme disclosed herein has the ability to ignore changes due to motion or any telecine sequence and isolate just the vertical cuts. A person of ordinary skill in the art will appreciate that the techniques described herein are applicable to the processing of interlaced or progressive video.

3. Apparatus for Detecting Vertical Cuts

A modern digital video signal contains a series of sequential images, each made from a group of sequential pixels. Each pixel is typically composed of several components each having a numerical value, for example, a luminance (brightness) component LUMA and a chrominance (color) component CHROMA, each having numerical values representing the amplitude or brightness of a pixel and its color. In a common embodiment, the numerical values are 10-bit numbers producing an amplitude range of over 1000 levels. Other common component formats such as RGB will work equally well with this process.

Traditional detectors directly compare two sequential images to determine a magnitude of change between images. The result is a signal of varying amplitudes for each pixel in the image. Traditional detectors total these varying amplitudes for each pixel to arrive at a total magnitude of change for the image, often called a sum-of-absolute-differences (SAD). However, using the traditional method, it is difficult to determine if the change is due to motion, 3:2 sequences, or vertical cuts. Depending on the content of the original images, large solid objects might produce very little change during motion, while a small object high in detail can produce a large change while in motion. This makes it difficult to determine how much of the total change is due to motion. Additionally, video with a 3:2 sequence could produce a total change result of zero every five images, as the extra repeated images are compared with their identical neighbors.

In this disclosure, a different approach is taken by first converting each image into a simple quantifiable single bit form. This is done for three reasons. First, by simplifying the image to a minimum amount of information, there will be less overlap in the event of a vertical cut when it is compared to a neighboring image. Second, by using only one bit per pixel, logical manipulations can be performed on the image, which is not possible with a standard video image. Third, the amount of information within the image can be absolutely measured and used to determine a percentage-of-change between images, which is not possible with a standard video image.

Once a vertical cut is detected, frames or fields may be added or removed at that point as required to provide a time altered video program. To that end, a real-time circuit for simplifying and analyzing video signals will now be described.

A. Image Simplification:

Referring now to FIG. 1, a circuit 100 for generating a simplified image having only active changed pixels is illustrated. In this embodiment, the input signal to the circuit 100 has two components, namely the luminance component (LUMA) and the chrominance component (CHROMA), which are numerical values representing the amplitude or brightness of a pixel and its color, respectively. These numerical values are typically 10-bit numbers capable of a range having over 1000 levels. Alternately, other components could be used such as RED, GREEN, and BLUE for a RGB format.

An image filter 102 receives the input signal (LUMA and CHROMA components) for each pixel and converts the signal to a single bit output at node 103 representing a simplified current image labeled CURRENT. Note: The CHROMA component is not required to produce the simplified image, but it does improve the overall accuracy. The image filter 102 is further illustrated in FIG. 2 and explained in more detail below.

The simplified current image CURRENT is also passed through a delay element 104 which generates a delayed image DELAY at node 105, which is the simplified current image CURRENT delayed by one frame (or two fields). This allows the most recent simplified image CURRENT to be compared with the simplified image that occurred one frame (or two fields) earlier, namely the delayed simplified image DELAY. One frame (or two fields) of delay is used for interlacing schemes so that a field-1 is only compared with another field-1, and not with a field-2. This eliminates any adverse effects that might be produced by differences in vertical detail between field-1s and field-2s.

It might be assumed that subtracting the delayed image from the current image of a subject that is not moving would produce a complete cancellation and thus no change. This assumption is incorrect for several reasons: the subject may be imperceptibly moving due to actions such as breathing; the camera may not be steady; mechanical errors may be produced by film scanners; and random noise may be present. All of these factors can cause the subject to move at least a few pixels in any direction. Comparing the images directly may falsely detect a large change if the entire image actually moves by only a few pixels.

Therefore, before comparing the simplified current and delayed images, a mask 106 is generated to filter out slight changes in motion in the current image, while a mask 108 is generated to filter out slight changes in motion in the delayed image. Each of the masks 106, 108 is created by stretching each active pixel bit in the image both horizontally and vertically. Stretching occurs by combining multiple delay taps of the active pixels through an OR gate, and uses horizontal line delays for vertical stretching and pixel clock delays for horizontal stretching. The mask represents an area around active pixels in the image where motion will be ignored. The size of the mask determines how much motion is required before it is detected. Stretching by a few pixels in each direction is adequate to mask out slight changes in motion. Masks are created for both the current image and the delayed image.

To determine the change between the current and delayed images, a pseudo exclusive-or (XOR) function is used. As is well-known, XOR is a logic function where the output is active if either input is active, but not if both inputs are active at the same time. The pseudo XOR function described herein is similar, except that the mask signals are used to combine the active pixels. The output from mask 106 is inverted and fed into AND gate 110. Likewise, the output from mask 108 is inverted and fed into AND gate 112. The other input to AND gate 110 is the current image CURRENT, while the other input to AND gate 112 is the delayed image DELAY. The outputs from AND gate 110 and AND gate 112 are fed into OR gate 114 and the resultant output is a new changed image CHANGE having active pixels from both images, except where the image was nominally the same (such as a subject not in motion). The resulting change image contains only active pixels due either to large motion, or to vertical cuts.

Figure 2:
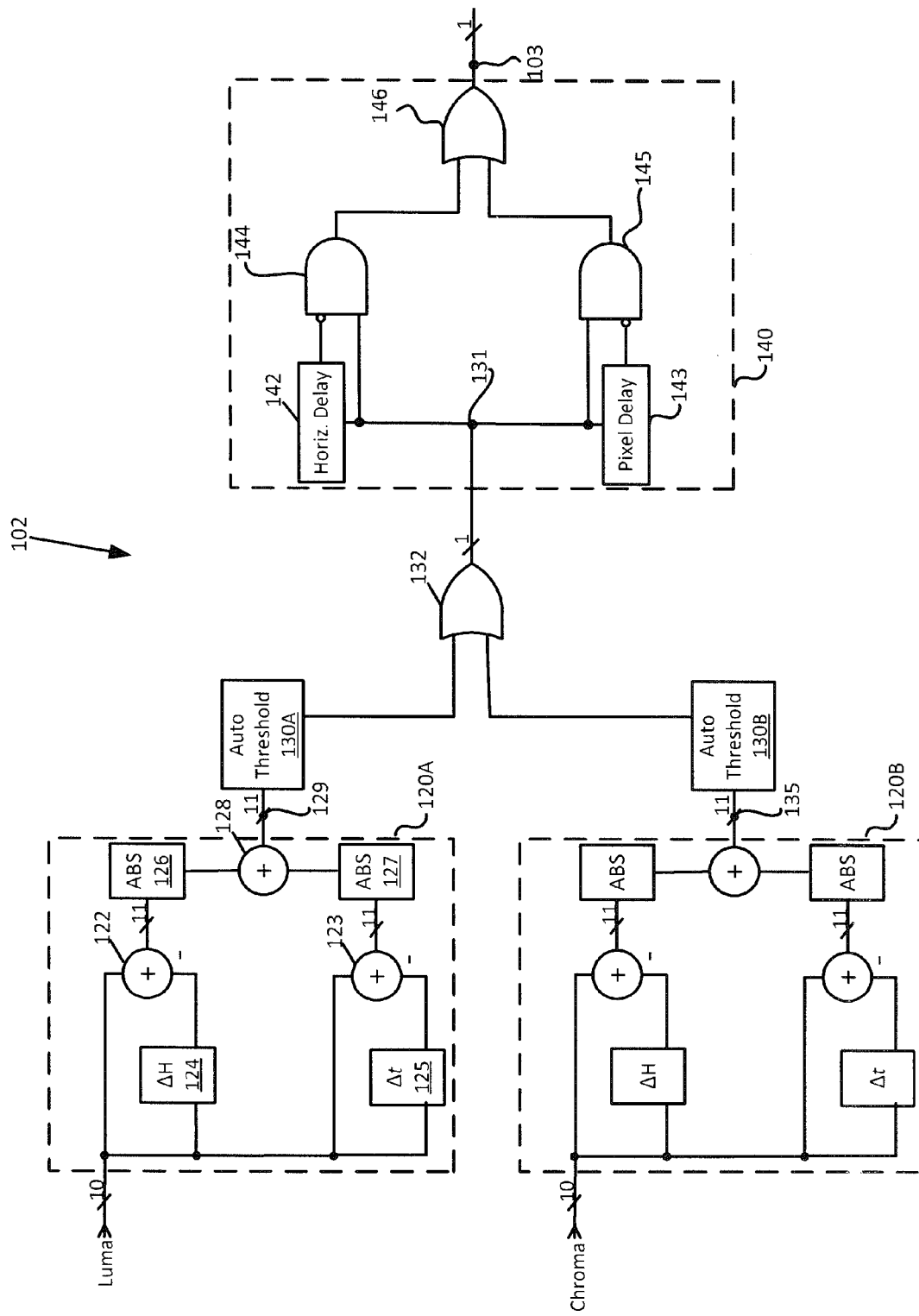
FIG. 2 is a block diagram illustrating a circuit for an image filter portion of FIG. 1.
Figure 3:
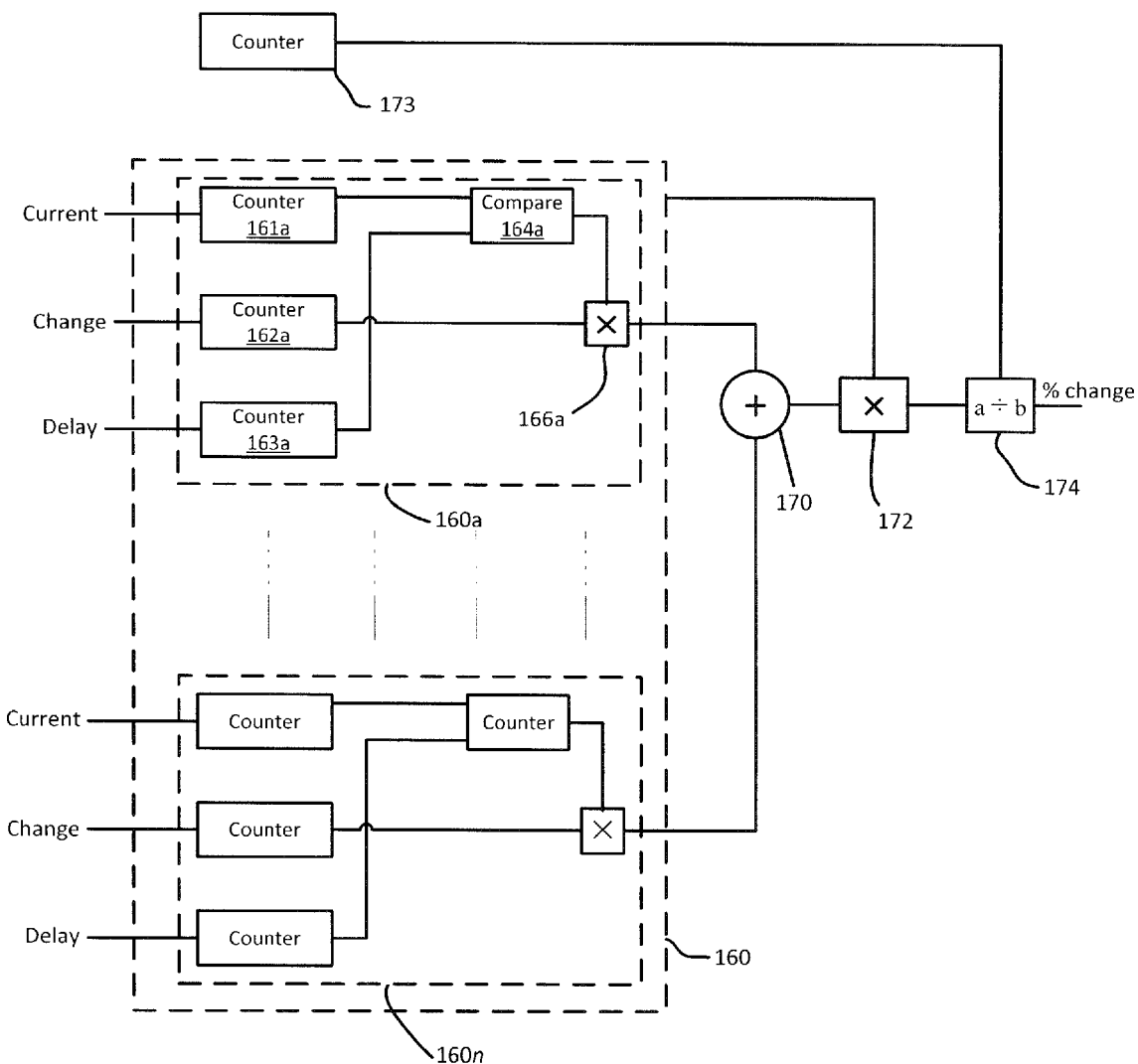
FIG. 3 is a block diagram illustrating a circuit for counting active pixels to determine a percentage of change.

Referring now to FIG. 2, the simplified image filter 102 is shown in more detail. Each video component (LUMA and CHROMA in this embodiment) is filtered individually and combined with an OR gate 132 at the final output filter. A differential filter 120A is used in both the horizontal and vertical directions to remove unwanted information from each pixel within the LUMA component of the video image. Likewise, a differential filter 120B is used in both the horizontal and vertical directions to remove unwanted information from each pixel within the CHROMA component of the video image. The differential filters 120A, 120B each compare neighboring pixels to subtract out common colors and amplitude values. This has the effect of eliminating large solid areas of the picture and leaves only image detail.

In one embodiment, one part of the differential filter 120A receives the LUMA component directly as an input to adding circuit 122 (which is configured as a subtracting circuit), and also as an input to a vertical aperture 124. The vertical aperture 124 is a delay element having increments of horizontal lines ($\Delta H$) where each H is equivalent to a one pixel shift in the vertical direction. The output of the vertical aperture 124 is the subtracted input to the adding circuit 122. The output of the adding circuit 122 is an 11-bit value (10 bits plus a sign bit) that is input to an absolute value circuit (ABS) 126, resulting in a 10-bit positive value. Likewise, the other part of the differential filter 120A also receives the LUMA component directly as an input to adding circuit 123 (which is configured as a subtracting circuit), and also as an input to a horizontal aperture 125. The horizontal aperture 125 is a delay element ($\Delta t$) where each t is equivalent to a one pixel shift in the horizontal direction. The output of the horizontal aperture 125 is the subtracted input to the adding circuit 123. The output of the adding circuit 123 is an 11-bit value (10 bits plus a sign bit) that is input to an absolute value circuit (ABS) 127, resulting in a 10-bit positive value. The 10-bit differential outputs from ABS circuits 126 and 127 are added together by adding circuit 128 to yield an 11-bit value at node 129 representing a filtered image containing only the desired details of the original image.

The aperture, or number of pixels used in the differential filters 120A, 120B, determines the range of details, from fine to course, that are to be kept. The aperture is adjusted to highlight the edges of objects such as a person's body or face but ignore very high detail, such as blades of grass or strands of hair, which would overwhelm the result. The aperture values are determined by the images resolution and will be different for each video standard. The actual values used were determined experimentally to achieve the best performance.

The details within the filtered images at nodes 129 and 135 each produce waveforms with peaks varying in amplitude and width, and must be further simplified. Using comparator circuits 130A and 130B, the pixels in each component's filtered image are each compared with a threshold value and a single bit is set at node 131 if detail is present in either the LUMA component or the CHROMA component. Because the amplitude of each waveform varies, a fixed threshold will not produce optimum results, therefore, for each component an adaptive threshold is used. In one embodiment, a varying upper magnitude is produced by interpolating between peak values of the waveform, and a lower magnitude is produced by a continuous average of all values of the waveform. The threshold is set to a value half way between the upper and lower magnitudes plus a fixed offset to account for signal noise. This effectively slices the varying amplitude waveform, producing a single bit result for each pixel.

The single bit results from evaluating the LUMA and CHROMA components (or RED, GREEN, and BLUE if using RGB components) are combined through an OR gate 132. Thus, if either or both of the LUMA and CHROMA signals lead to the generation of a single bit after threshold comparison, then the output of the OR gate 132 is also a single active bit at node 131. Due to the waveform's varying widths, the single bit results will also vary in width. A final filter 140 is used to reduce the width by eliminating all continuous set bits after the first pixel. The single bit at node 131 is provided as an input to horizontal delay circuit 142, pixel delay circuit 143, AND gate 144, and AND gate 145. The output of the horizontal delay circuit 142 is inverted and input to AND gate 144. The output of the vertical delay circuit 143 is inverted and input to AND gate 145. The output of the AND gates 144 and 145 are input to the OR gate 146, and the output of the OR gate is a simplified one-bit representation of all detail within the pixel image, at node 103.

B. Image Analysis:

The active pixels for the simplified CURRENT, DELAY, and CHANGE images are each counted. These counts are used to determine if change has occurred, what type of change, and to calculate a final percentage-of-change that ignores motion. The method of counting and the calculations used will be presented in more detail below. A simplified analysis is demonstrated by the following examples.

EXAMPLE 1

Assume an object within the image produces 25 active pixels. If the object is moving, it will be present in numerous frames. Therefore, the CURRENT count will be 25 and the DELAY count will be 25. The CHANGE count could be as high as 50 if there is no overlap between frames. By comparing the CURRENT and DELAY counts, no substantial difference is found (25−25=0). A weighting factor is created that is proportional to the difference value. A low weighting value indicates a likelihood that the CHANGE count is mostly due to motion. In this case, a low weighting factor of 0% will be applied to the CHANGE count, reducing it to a value approaching zero (50×0%=0). If the adjusted CHANGE count is divided by the maximum count, then the percentage-of-change equals 0% (0/25=0.0). Therefore, there was no change due to a vertical cut.

EXAMPLE 2

If the same object suddenly appears due to a scene change, then the CURRENT count will be 25, the DELAY count has 2 from a previous image, and the CHANGE count could be 27. In this situation, the difference between the CURRENT and DELAY counts is significant (25−2=23), thus a high weighting value of 92% is created. This value makes it likely that the CHANGE count represents a vertical-cut. 92% will be applied to the CHANGE count, resulting in a value approaching 25 (27×92%=24.84). If the adjusted CHANGE count is divided by the maximum count, then the percentage-of-change equals 99% (24.84/25=0.994). Therefore, most of the change that occurred is due to a vertical cut.

The analysis begins by dividing the image into N multiple overlapping sections 160. In one embodiment, the image is divided into 16 sections or sub-images arranged in a 4×4 grid. This is done for two reasons. First, by requiring that change be distributed over half of the image, the possibility of falsely detecting a vertical cut is reduced when large objects move into the image from an edge. Second, by comparing the active pixel totals per section with the delayed image, an estimate of motion versus vertical cut can be made. Each section 160 of the image employs counters, which count the total number of active pixels in the current, delayed and change images. The counters employ a weighting scheme at the overlapping edges of the sections 160 to compensate for detail elements which are transitioning between sections. In one embodiment, active pixels are each counted as 1 at the outside edge of the section and gradually count as 8 for the section area that does not overlap. The total counts are then divided by 8. The totals of these counters are compared to determine if change has occurred, and further, the likelihood that the change is due to motion, or to an abrupt scene change, i.e., a vertical cut.

For example, section 160a includes three counters 161a, 162a, 163a. The current image CURRENT from node 103 is input to counter 161a, the delayed image DELAY from node 105 is input to counter 163a, and the changed image CHANGE from the OR gate 114 is input to counter 162a. The count of total active pixels in the current image (counter 161a) is compared with the count of total active pixels in the delayed image (counter 163a) by comparator 164a. The comparator 164a produces a weighting value from 0 to 1.0 based on the difference between CURRENT and DELAY counts. The count difference is divided by the larger of the CURRENT or DELAY counts to produce the weighting value. A value of zero would indicate the same number of active pixels occurred in both the current and delayed images, which typically happens when the same detail elements are in both images—such as an object in motion. A value of 1.0 would indicate a massive difference between the current and delayed images, which typically happens when a new detail element appears in one image—such as a vertical cut. The total active pixel count for the changed image (counter 162a) is input to a multiplier 166a where the count is multiplied by the weighting value, to produce an adjusted active pixel count for that section's changed image.

The total adjusted active pixel counts for the changed image in all count and compare sections 160 are added together by adding circuit 170 to produce a total changed pixel count. An additional weighting factor is applied to the total changed pixel count by multiplier 172 based upon the distribution of sections indicating a possible vertical cut. The weighting factor is determined by the number of sections having a comparator weighting value greater than 0.5 (more likely to be a vertical cut), divided by the number of sections. This additional step helps prevent false vertical cut detection by requiring that changes occur in multiple sections of the image. Finally, the active pixels within the CURRENT and DELAYED simplified image (all sections) are input to counter 173 to determine the total maximum pixel count for the entire image (MAX=the larger of the CURRENT or DELAY counts). The weighted total changed pixel count (A) from multiplier 172 is divided by the total maximum pixel count (B) from counter 173 in multiplier circuit 174 (configured as a divider circuit) to produce an 11-bit percentage-of-change value from the original image.

Figure 4:
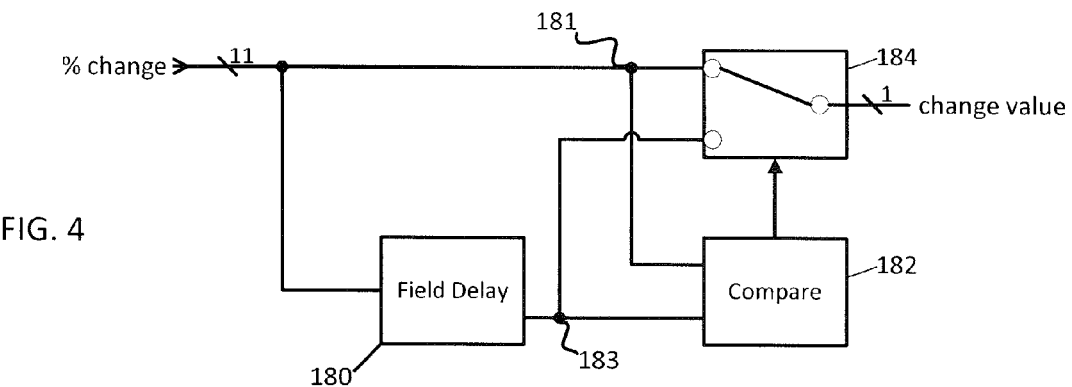
FIG. 4 is a block diagram illustrating a circuit that provides compensation for a telecine sequence.

Referring now to FIG. 4, the percentage-of-change value output from multiplier 174 is registered with a one-frame (two fields) delay element 180. This allows the percent-of-change value from the most recent image at node 181 to be compared by comparator 182 with the percentage-of-change value from the previous image, which is output from the delay element 180 at node 183. A selector circuit 184 then chooses the largest value from the comparator 182 as the final image-change value.

This comparison process compensates for a possible 3:2 sequence. Without this compensation, a video source that has a 3:2 sequence will produce a near-zero percentage-of-change every 5 fields. With this compensation, however, the near-zero value is replaced with a previous value, maintaining the natural progression of the percentage-of-change values during periods of motion.

The final image-change value is a measurement of how the video image changes from field to field. If there is no motion or no vertical cut, then the value will be zero. If there is motion, then the value indicates the amount of motion and is usually continuous over many consecutive fields. If a vertical cut occurs, then the value will suddenly increase in magnitude for three fields and then return to its nominal value.

Figure 5:
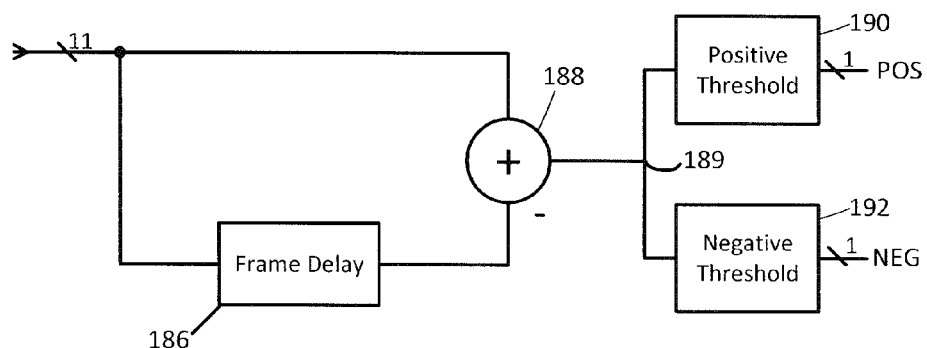
FIG. 5 is a block diagram illustrating a circuit for comparing the change value to positive and negative threshold values.
Figure 7:
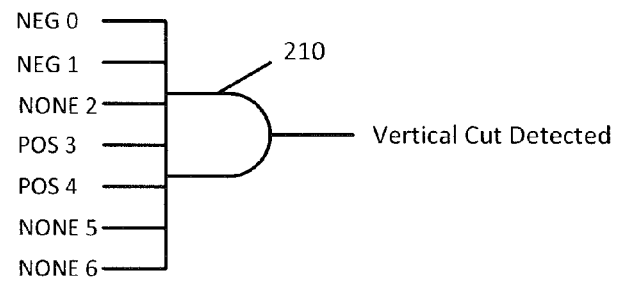
FIG. 7 is a block diagram illustrating the logic for detecting a vertical cut by evaluating a predefined pattern in the array of FIG. 6.

As shown in FIG. 5, the change-value for the final image is taken from selector circuit 184 and then registered with a one-frame (two fields) delay element 186. The output of the delay element 186 is a change-value for the delayed image, which is subtracted from the change-value for the final image using adding circuit 188 (configured as a subtracting circuit). This results in a measurement of change between images at node 189. The value of this measurement will be zero if there is no motion, or if there is motion at a constant velocity. A value other than zero will be produced only if the motion accelerates or decelerates, or if there is a vertical cut. The measurement of change at node 189 is compared to a positive change threshold set in comparator 190 and compared to a negative threshold set in comparator 192. A one-bit output from comparator 190 will be set if there is a large positive change in the image, while a one-bit output from comparator 192 will be set there is a large negative change in the image. The lack of an output from either comparator 190 or comparator 192 means there is negligible change in the image.

Figure 6:
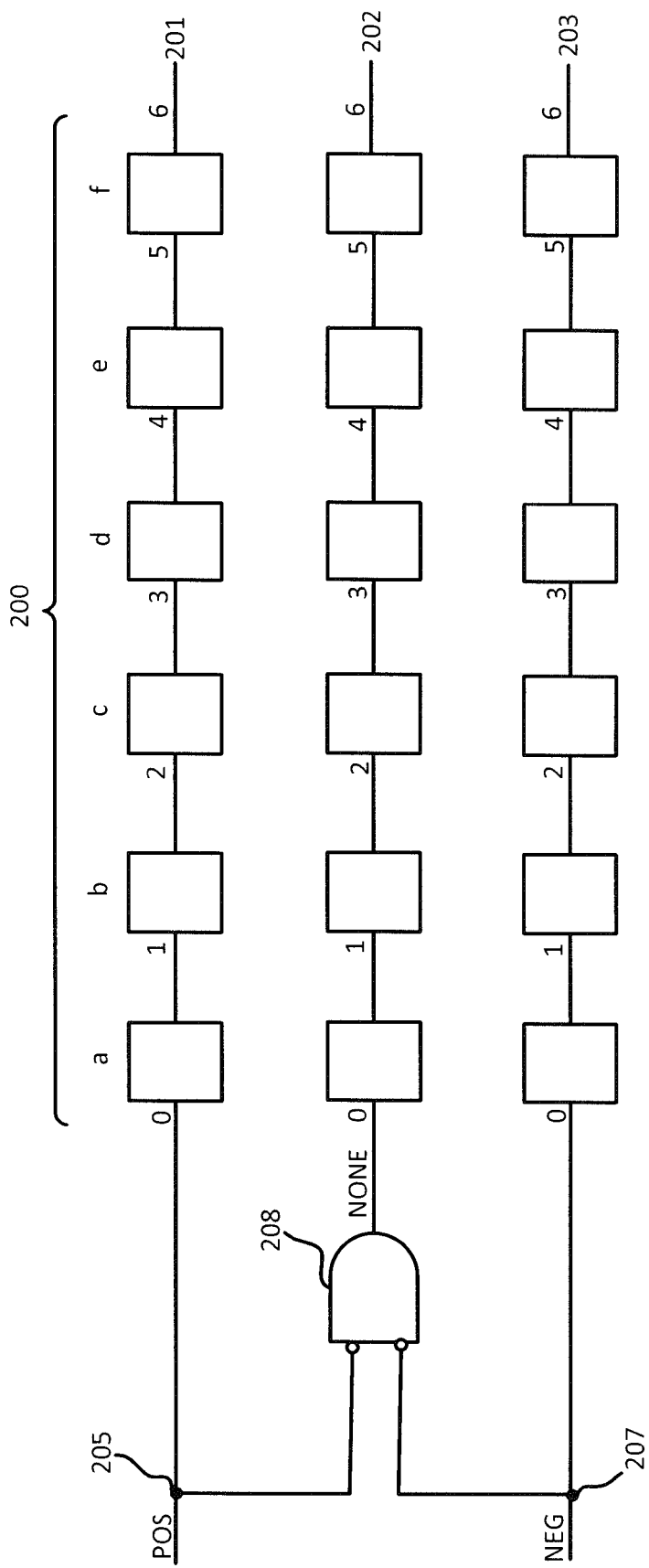
FIG. 6 is a block diagram illustrating a circuit having an array of field delay elements for comparing historical change values over a sequence of frames.

The large positive change and large negative change results are registered with a series of field delay elements 200, as shown in FIG. 6, to provide historical results, for example, from the six previous images. The one-bit output POS from comparator 190 is provided as input via node 205 to a series-connected row 201 of delay elements starting at a first delay element 201*a*. The output of the first delay element 201*a* is provided as input to a second delay element 201*b*, which generates an output that is input to third delay element 201*c*, and so on, until sixth delay element 201*f*. Likewise, the one-bit output NEG from comparator 192 is provided as input via node 207 to a series-connected row 203 of delay elements starting at first delay element 203*a*, which generates an output that is input to a second delay element 203*b*, which generates an output that is input to a third delay element 203*c*, and so on, until sixth delay element 203*f*.

The POS input at node 205 and the NEG input at node 207 are also provided as inputs to NAND gate 208. The output of the NAND gate 208 is the NONE bit, which is set to active if both the POS input and the NEG input are not active. The NONE bit is provided as input to a series-connected row 202 of delay elements starting at a first delay element 202*a*, which generates an output that is input to a second delay element 202*b*, which generates an output that is input to a third delay element 202*c*, and so on, until sixth delay element 202*f*.

By analyzing the results over a set of current and previous fields, a pattern will emerge to detect if a vertical cut has occurred. For example, in one embodiment, the pattern detected at the outputs of the array of field delay elements 200 will be <none, none, positive, positive, none, negative, negative>, which has been empirically determined to positively indicate a vertical cut. This pattern may be readily detected using AND gate 210, as shown in FIG. 9, and to combine as inputs to the AND gate the inputs to delay elements 203*a*, 203*b*, 202*c*, 201*d*, 201*e*, 202*f*, as well as the output of delay element 202*f*.

4. Process for Detecting Vertical Cuts

Figure 8:
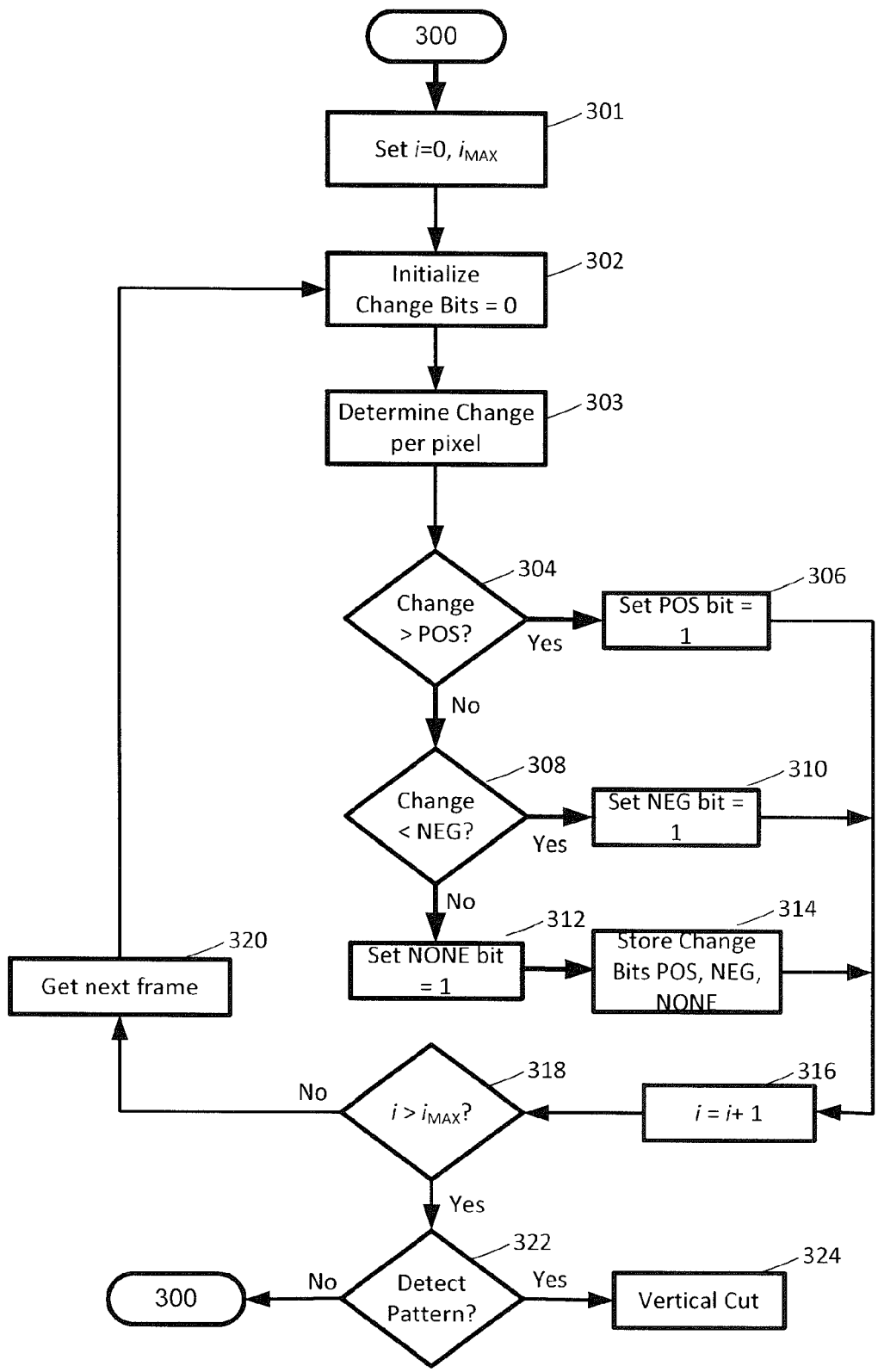
FIG. 8 is a flow chart illustrating a process for detecting a vertical cut in a sequence of video frames.

A process 300 is illustrated in FIG. 8 for analyzing a sequence of digital video images in order to detect a vertical cut. Each field or frame of the video images may be analyzed in real-time using a hard-wired circuit system as described above. However, it is conceivable that a computer-implemented embodiment could also be produced, as will now be described.

In step 301, a process index i is initialized and set equal to zero, and a maximum value $i_{MAX}$ for the process index i is defined. The maximum value $i_{MAX}$ for the process index i is the number of sequential frames to evaluate in the process 300 for making a determination regarding a vertical cut. In one embodiment, the maximum value $i_{MAX}$ is set to 6, i.e., a series of 6 sequential frames will be evaluated to see if a predefined pattern of change in the sequence of images can be detected. If the predefined pattern of change is detected for the selected number of frames, then a vertical cut is indicated.

In step 302, a set of three change bits, namely a first change bit, a second change bit, and a third change bit, is initialized by clearing the bits, i.e., setting the bits to 0. A bit with a 0 value is considered cleared or inactive herein, while a bit which is set to 1 is considered active.

In step 303, a change value is determined between each pixel of a current frame and each pixel of a delayed frame of the video signal. The determination of a change value in step 302 is a key part of the process 300, and is described in more detail below.

In step 304, the change value is compared to a first or positive threshold, which is set to a large positive value. If the change value is greater than the positive threshold, meaning that the change value is a large positive value, then the first change bit (POS) is set to 1 in step 306. If the change value is not greater than the positive threshold in step 304, then the change value is compared to a second or negative threshold in step 308. The second threshold is set to a large negative value. If the change value is less than the negative threshold, meaning that the change value is a large negative value, then the second change bit (NEG) is set to 1 in step 310. If the change value is not less than the negative threshold in step 308, then it was also not greater than the positive threshold in step 304, and therefore the third change bit (NONE) is set to 1 in step 312, indicating that the change between the current and delayed images is zero or negligible.

In step 314, the three change bits are stored in a data store. Only one of the three change bits will be set to an active state in one of steps 306, 310, or 312, and the other two change bits are not set, i.e., they remain in an inactive or cleared state from step 302.

In step 316, the process index i is incremented to i+1. In step 318, the process index i is compared to a preset maximum value $i_{MAX}$. If the process index i is less than or equal to the preset maximum value $i_{MAX}$, then the next sequential frame will be retrieved in step 320, and the process returns to step 302 to determine and evaluate the change values for the next frame.

However, if the process index i is greater than the preset maximum value $i_{MAX}$ in step 318, then an adequate number of frames have been examined. At this point, the data store has stored a series of change bits corresponding to a sequence of frames, each discrete set of POS, NEG and NONE change bits describing a specific frame.

In step 322, the series of change bits in the data store are examined for a specific predefined pattern. If the predefined pattern is detected, then a vertical cut has likewise been detected and is reported in step 324. If the predefined pattern is not detected, then a vertical cut has not been detected, and another sequence of frames can be evaluated using process 300.

Figure 9A:
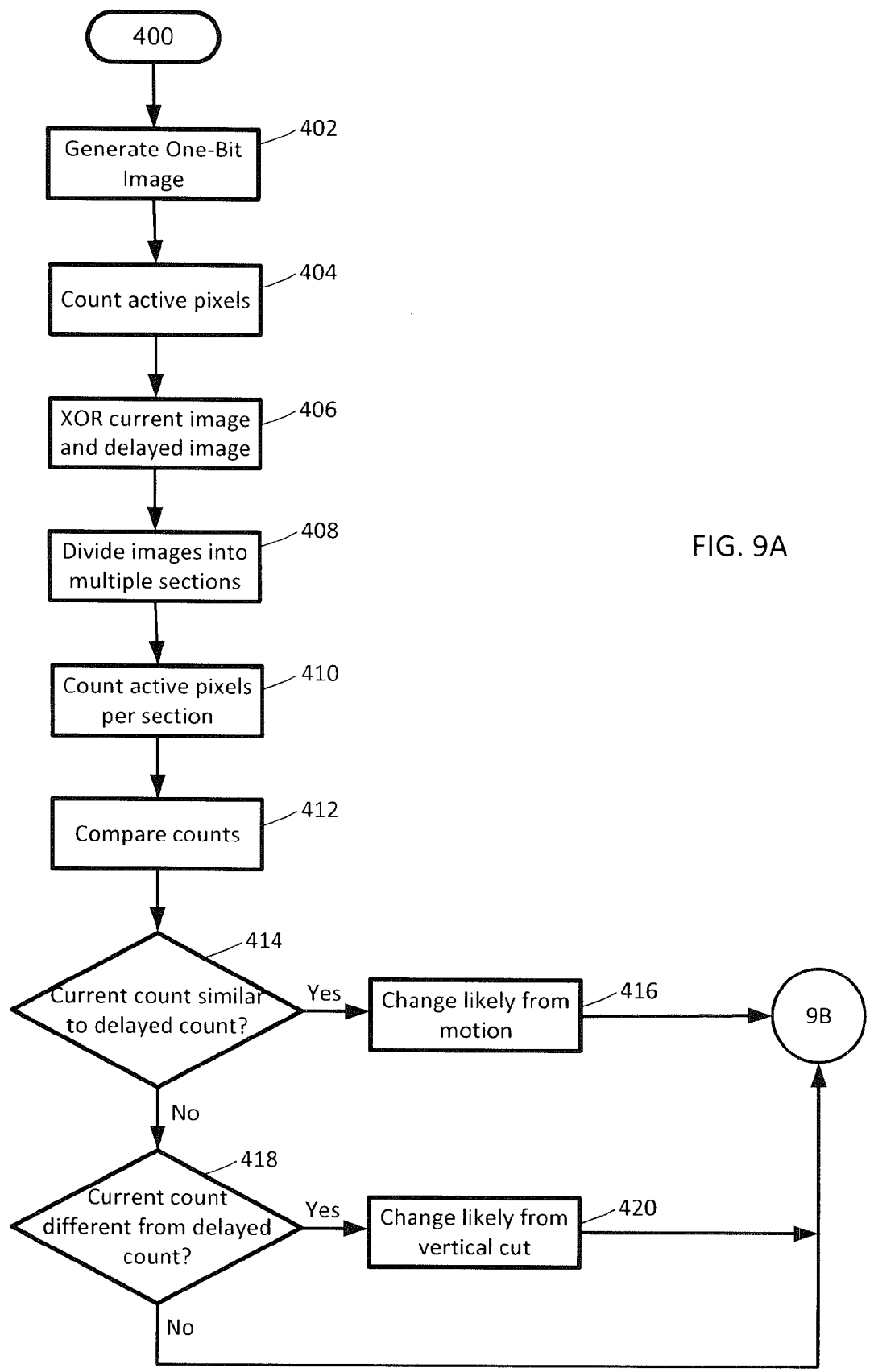
FIGS. 9A and 9B are flow charts illustrating more details of the process shown in FIG. 8 for detecting a vertical cut in a sequence of video frames.
Figure 9B:
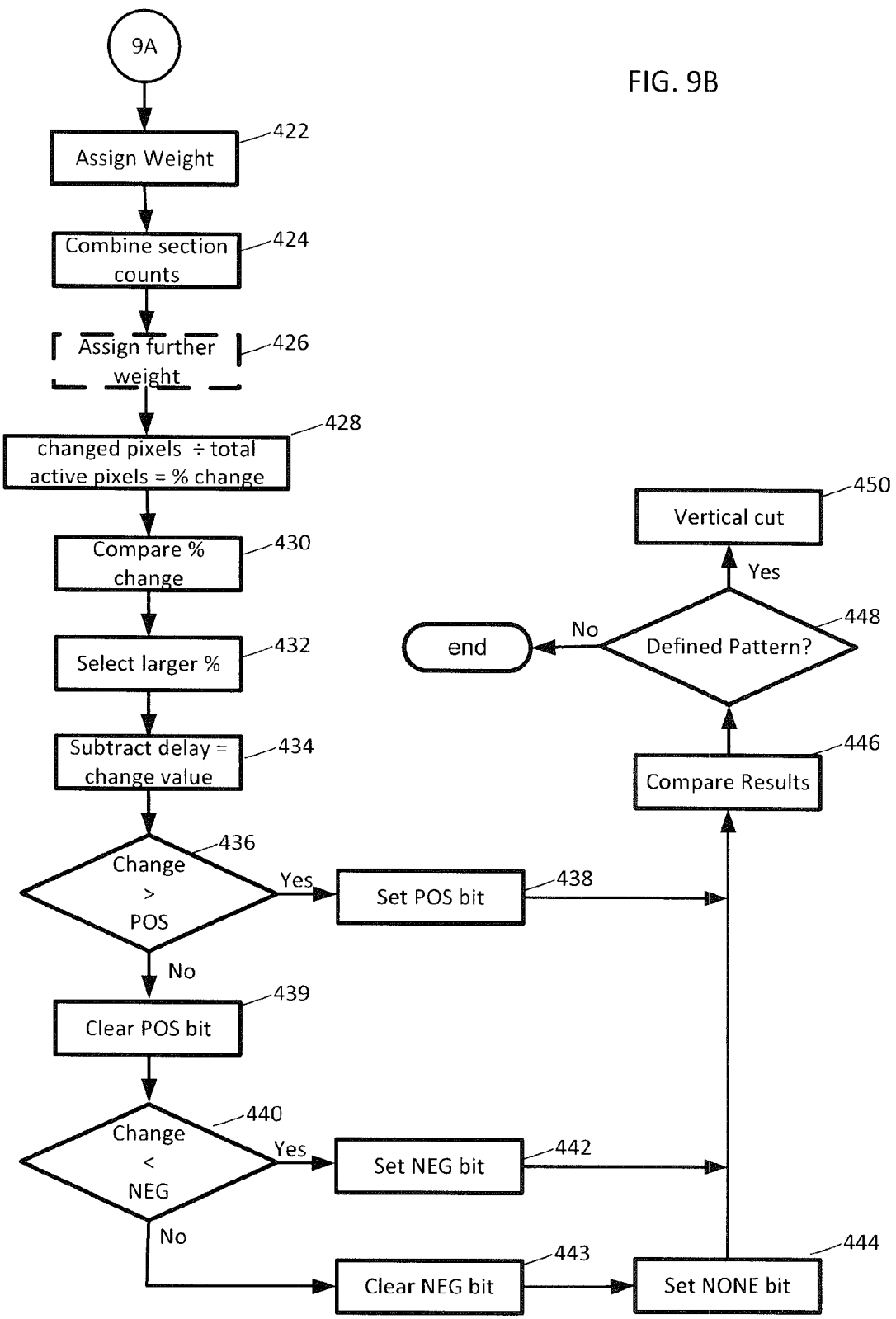

FIGS. 9A and 9B illustrate a process 400 for analyzing a sequence of digital video images in order to detect a vertical cut. Process 400 is consistent with process 300 but includes more process details.

In step 402, a simplified one-bit representation of the image is generated for each pixel. The bit is set as active only where picture detail is present in the pixel, and if there is no detail in the pixel, the bit is cleared. In step 404, all the active one-bit pixels of the simplified image are counted to yield a total number of active pixels, to be used later in the process to determine a percentage-of-change in the image.

In step 406, the active pixels of the current simplified image are combined using an exclusive-OR function (XOR) with the active pixels of the previous (delayed) simplified image (i.e., from the previous frame or two fields) to produce a new (changed) image representing the change between frames. In the changed image, the one-bit pixels are active only where image detail has changed. In step 408, the simplified-image, the delayed simplified-image, and the change-image are each divided into multiple sections, wherein each section represents a portion of the overall image. In step 410, for each section, the active one-bit pixels are counted to produce a total number of active pixels.

In step 412, for each section, the active pixel counts for the current image and the delayed image are compared. If the total active pixel count for the current image is similar to the total active pixel count for the delayed image in step 414, then any differences in the image are likely attributed to motion in step 416. If the total active pixel count for the current image is not similar to the total active pixel count for the delayed image in step 414, but instead, the count is significantly different in step 418, then any differences in the image are likely attributed to vertical cuts in step 420.

In step 422, the total active pixel count for the changed image in each section is assigned a weight based upon the result of steps 412-420. If it was determined that the changes resulted from a vertical cut, then the changed image is assigned a larger weighting factor. If instead it was determined that the changes resulted from motion, then the changed image is assigned a smaller weighting factor. The weighting factors are discussed further below.

In step 424, the total active pixel counts for all sections of changed images are combined to produce a total number of active changed pixels for the entire image. This value may be assigned an additional weighting factor in step 426 based upon the distribution of sections.

In step 428, the total number of active changed pixels is divided by the total number of active pixels from the larger of the current or delayed images to produce a percentage-of-change for the current image. In step 430, the percentage-of-change for the current image is compared with the percentage-of-change for the delayed image of the previous field, and the larger of the two values is chosen as the final change-value in step 432. This is the mechanism used to filter out any incorrect low values produced by a 3:2 sequence.

The final change-value is combined with the change-value of the previous frame (two fields) in step 434 by subtracting the frame-delayed value from the final change-value to produce a delta-change value. The delta-change value is compared to a positive threshold. If the delta-change value is greater than the positive threshold in step 436, then a first bit is set=1 in step 438. Otherwise, the first bit is cleared in step 439, and the delta-change value is compared to a negative threshold. If the delta-change value is less than the negative threshold in step 440, then a second bit is set=1 in step 442. Otherwise, the second bit is cleared in step 443, and a third bit is set=1 in step 444. Only one of the first, second and third bits is set=1 is the above comparisons, and the other two bits remain cleared, i.e. =0.

Historical results from the comparison steps over a number of frame sequences are evaluated in step 446. Advantageously, an array of first, second and third bits corresponding to a sequence of frames may be stored in a data store, as further described below, and the array may be evaluated to determine if the array contains a particular predefined pattern of the bits. If the predefined pattern is detected in step 448, then an output is generated indicating a vertical cut in step 450. Thus, alteration of the video signal may be implemented by adding or removing frames at the position of the vertical cut identified by the process.

5. Hardware/Software Environment

Embodiments of this disclosure are preferably implemented as hard-wired circuits, but can also be implemented in numerous other ways, including as a process, an apparatus, a system, a device, a method, a computer readable medium such as a computer readable storage medium containing computer readable instructions or computer program code, or as a computer program product comprising a computer usable medium having a computer readable program code embodied therein. Thus, the digital signal processing elements described herein can be one or more computer-based devices, running a conventional operating system, and coded using well-known programming languages, including C, C++, C#, Pascal, Fortran, Perl, Matlab (from MathWorks), SAS, SPSS, JavaScript, CoffeeScript, Objective-C, Objective-J, Ruby, Python, Erlang, Lisp, Scala, Clojure, Java, and other known programming languages.

In the context of this disclosure, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information.

6. Conclusion

Those skilled in the art will appreciate that known techniques for measuring and cropping the corollary audio signal, such as, for example, those disclosed in U.S. Pat. No. 7,092,774, which is incorporated herein by reference, can be used in conjunction with the video signal alteration techniques disclosed above to provide a time altered audio/video program signal. It should be understood that the particular embodiments of the subject matter described above have been provided by way of example and that other modifications may occur to those skilled in the art without departing from the scope of the claimed subject matter as expressed by the appended claims and their equivalents.

The invention claimed is:

1. A digital signal processing apparatus for detecting a vertical cut in a sequence of video images, comprising: a filter configured to receive a plurality of pixels comprising a current image, and for each pixel, to remove pixel values from each pixel of the current image that are a same value as those in a defined set of neighboring pixels to generating a filtered image, and to set a single current pixel bit to active for each pixel having a detail after being filtered; a frame delay element configured to cause a one frame delay for the current image resulting in a delayed image, each pixel of the delayed image having a delayed pixel bit with the same value status as the current pixel bit; an exclusive OR circuit configured to generate a changed pixel bit which is set to active when either but not both of the current pixel bit and the delayed pixel bit are set and cleared otherwise; a counter configured to generate a count of the number of active pixels in the current image, the delayed image, and the changed image; a multiplier configured to apply a weighting factor to the count of active pixels in the changed image, wherein a high weighting factor is applied when the count of active pixels in the current image is different from the count of active pixels in the delayed image, and wherein a low weighting factor is applied when the count of active pixels in the current image is similar to the count of active pixels in the delayed image; a comparator configured to compare the weighted count of active pixels in the changed image to a positive threshold and a negative threshold, wherein a positive bit is set when the positive threshold is met, wherein a negative bit is set when the negative threshold is met, and wherein a none bit is set when the neither the positive or negative threshold is met; and a series of delay elements configured to store each set of the positive bit, the negative bit, and the none bit from the comparator for each sequential images; and a detector configured to detect a defined pattern of positive bits, negative bits and none bits that are set in the series of delay elements, wherein the defined pattern indicates a vertical cut in the current video signal.

2. The apparatus of claim 1, the filter further comprising:

a vertical aperture coupled to the pixel, the vertical aperture defined by a horizontal period of the digital video image;
a horizontal aperture coupled to the pixel, the horizontal aperture defined by a pixel period of the digital video image;
a first adder coupled to the pixel and to the vertical aperture for subtracting the output of the vertical aperture from the pixel;
a second adder coupled to the pixel and to the horizontal aperture for subtracting the output of the horizontal aperture from the pixel; and
a third adder for adding the outputs of the first and second adders.

3. The apparatus of claim 2, the filter further comprising: a comparator configured to set the current pixel bit when the output of the third adder exceeds a filter threshold.

4. The apparatus of claim 3, wherein the filter threshold is set by an adaptive method.

5. The apparatus of claim 4, wherein the adaptive method sets the filter threshold to a value that is halfway between a peak amplitude value of the image and a noise amplitude value of the image.

6. The apparatus of claim 2, wherein the vertical aperture and the horizontal aperture are adjusted to highlight the edges of images.

7. The apparatus of claim 1, further comprising:
the delay elements are organized as an array having a plurality of columns and three rows, wherein the first row is allocated to store a series of positive bits, the second row is allocated to store a series of none bits, and the third row is allocated to store a series of negative bits; and
the defined pattern of set bits over a number of columns is the none bit, the none bit, the positive bit, the positive bit, the none bit, the negative bit, and the negative bit.

8. The apparatus of claim 1, the exclusive OR circuit further comprising: a first mask coupled to the current pixel bit and configured to filter out small changes in motion relative to neighboring pixels when the current pixel bit is active; a second mask coupled to the delayed pixel bit and configured to filter out small changes in motion relative to neighboring pixels when the delayed pixel bit is active; a first AND gate coupled to the current pixel bit and the inverted output of the second mask; a second AND gate coupled to the delayed pixel bit and the inverted output of the first mask; and an OR gate coupled to the outputs of the first and second AND gates.

9. A circuit for detecting a vertical cut in a sequence of digital video images, each digital video image having a frame including a plurality of pixels, each pixel having a plurality of bits defining a pixel value, comprising: a change circuit configured to determine a change value between a current frame and a delayed frame for each pixel; a first comparator circuit configured to generate a first change bit which is set when the change value exceeds a positive threshold, and to generate a second change bit which is set when the change value exceeds a negative threshold, and to generate a third change bit which is set when the change value does not exceed the positive threshold or the negative threshold, wherein the change circuit and the first comparator circuit operate on a plurality of sequential frames to generate corresponding sets of first, second and third change bits for each pixel in each frame; a data store, wherein each set of first, second and third change bits is stored in the data store in correspondence with a specific sequential frame thereby forming a series of first change bits, a series of second change bits, and a series of third change bits; and a detector circuit configured to identify a predefined pattern of set bits in the first, second and third series of change bits in the data store, wherein detection of the predefined pattern indicates a vertical cut in the current video signal.

10. The circuit of claim 9, the change circuit further comprising: a filter circuit configured to filter out pixel values for each pixel in the current frame that are a same value as those in a defined set of neighboring pixels, resulting in a set of filtered pixels; a second comparator circuit configured to compare a filtered pixel to a filter threshold for each pixel in the current frame, and to set a current pixel bit to active when the filter threshold is met indicating that the pixel contains detail; a delay circuit configured to generate a one frame delay for each filtered pixel in the current frame thereby resulting in a set of filtered pixels comprising the delayed frame, each pixel in the delayed frame having the status of the current pixel bit and stored as a delayed pixel bit; an XOR circuit configured to generate a changed frame having a changed pixel bit set when either but not both of the current pixel bit and the delayed pixel bit are set as active; a count circuit configured to count the number of active current pixels, active delayed pixels, and active changed pixels; a multiplier circuit configured to apply a weighting factor to the count of active changed pixels, wherein a high weighting factor is applied when the count of active current pixels is different from the count of active delayed pixels, and wherein a low weighting factor is applied when the count of active current pixels is similar to the count of active delayed pixels; and a third comparator circuit configured to compare the weighted count of active changed pixels to a positive threshold and a negative threshold, wherein a positive bit is set when the positive threshold is met, wherein a negative bit is set when the negative threshold is met, and wherein a none bit is set when the neither the positive or negative threshold is met; wherein the detector circuit is configured to identify the predefined pattern in a series of positive bits, negative bits and none bits corresponding to the sequence of digital video images.

11. The circuit of claim 10, the filter circuit further comprising:
a vertical aperture circuit configured with a horizontal period and having the pixel coupled to an input of the vertical aperture;
a first adder circuit coupled to the pixel and to an output of the vertical aperture, the first adder circuit configured to subtract the output of the vertical aperture from the pixel;
a horizontal aperture circuit configured with a pixel period and having the pixel coupled to an input of the horizontal aperture;
a second adder circuit coupled to the pixel and to an output of the horizontal aperture, the second adder circuit configured to subtract the output of the horizontal aperture from the pixel;
a third adder circuit coupled to the first and second adder circuits and configured to add the outputs of the first and second adder circuits.

12. The circuit of claim 10, wherein the filter threshold is set by an adaptive circuit.

13. The circuit of claim 12, wherein the adaptive circuit sets the filter threshold to a value that is halfway between a peak amplitude value of the image and a noise amplitude value of the image.

14. The circuit of claim 11, wherein the vertical aperture circuit and the horizontal aperture circuit are configured to highlight the edges of images.

15. The circuit of claim 10, further comprising:
a horizontal delay element coupled to the current pixel bit;
a pixel delay element coupled to the current pixel bit; and an OR gate coupled to the horizontal delay element and the pixel delay element, wherein the output of the OR gate is the current pixel bit.

16. The circuit of claim 9, the data store further comprising an array having a plurality of columns and three rows, wherein the first row includes the series of first change bits, the second row includes the series of third change bits, and the third row includes the series of second change bits.

17. The circuit of claim 16, wherein the predefined pattern of set bits over a set number columns is a sequence comprising the second change bit, the second change bit, the first change bit, the first change bit, the second change bit, the third change bit, and the third change bit.

18. The apparatus of claim 10, the XOR circuit further comprising: a first mask coupled to the current pixel bit and configured to filter out small changes in motion relative to neighboring pixels when the current pixel bit is active; a second mask coupled to the delayed pixel bit and configured to filter out small changes in motion relative to neighboring pixels when the delayed pixel bit is active; a first AND gate coupled to the current pixel bit and the inverted output of the second mask; a second AND gate coupled to the delayed pixel bit and the inverted output of the first mask; and an OR gate coupled to the outputs of the first and second AND gates.

19. A method for detecting a vertical cut in a sequence of digital video images using a digital signal processing computer, each digital video image having a frame including a plurality of pixels, each pixel having a plurality of bits each bit having pixel values, the method comprising: for each pixel, using the digital signal processing computer, determining a change value between a current frame and a delayed frame; for each pixel, using the digital signal processing computer, setting a first change bit when the change value exceeds a positive threshold and clearing the first change bit when not; setting a second change bit when the change value exceeds a negative threshold and clearing the second change bit when not; and setting a third change bit when the change does not exceed the positive threshold or the negative threshold otherwise clearing the third change bit; storing each of the first, second and third change bits in a data store; repeating the steps of determining a change value, of setting or clearing the change bits, and of storing the change bits for a plurality of sequential frames, for each set of first, second and third change bits stored in correspondence with a specific sequential frame is part of a series of first change bits, a series of second change bits, and a series of third change bits, respectively, stored in the data store; and detecting, using the digital signal processing computer, a defined pattern of set bits in the first, second and third series of change bits, wherein the defined pattern indicates a vertical cut in the current video signal.

20. The method of claim 19, wherein the step of determining a change value further comprises: for each pixel in the current frame, filtering out pixel values that are the same value as those in a defined set of neighboring pixels, resulting in a set of filtered pixels; for each filtered pixel in the current frame, comparing the filtered pixel to a filter threshold, wherein a current pixel bit is set and considered active when the filter threshold is met, indicating that the pixel contains detail, and cleared when not; for each current pixel bit whether active or not, generating a one frame delay resulting in a set of filtered pixels comprising the delayed frame and having the status of the current pixel bit stored now stored as the status of a delayed pixel bit; generating a changed frame having a changed pixel bit set when either but not both of the current pixel bit and the delayed pixel bit are set as active; counting the number of active current pixels, active delayed pixels, and active changed pixels; applying a weighting factor to the count of active changed pixels, wherein a high weighting factor is applied when the count of active current pixels is different from the count of active delayed pixels, and wherein a low weighting factor is applied when the count of active current pixels is similar to the count of active delayed pixels; and comparing the weighted count of active changed pixels to a positive threshold and a negative threshold, wherein a positive bit is set when the positive threshold is met, wherein a negative bit is set when the negative threshold is met, and wherein a none bit is set when the neither the positive or negative threshold is met; wherein the defined pattern is detected in a series of positive bits, negative bits and none bits corresponding to the sequence of digital video images.

21. The method of claim 20, wherein the step of filtering out pixel values further comprises:
   defining a vertical aperture based on a horizontal period of the digital video image;
   providing the pixel to the vertical aperture;
   subtracting the output of the vertical aperture from the pixel;
   defining a horizontal aperture based on a pixel period of the digital video image;
   providing the pixel to the horizontal aperture;
   subtracting the output of the horizontal aperture from the pixel; and
   adding the results of the two subtracting steps.

22. The method of claim 20, wherein the filter threshold is set by an adaptive method.

23. The method of claim 22, wherein the adaptive method sets the filter threshold to a value that is halfway between a peak amplitude value of the image and a noise amplitude value of the image.

24. The method of claim 21, wherein the vertical aperture and the horizontal aperture are adjusted to highlight the edges of images.

25. The method of claim 20, further comprising:
   subjecting the current pixel bit to a horizontal delay element;
   subjecting the current pixel bit to a pixel delay element; and
   selecting the current pixel bit from either the horizontal delay element or the pixel delay element.

26. The method of claim 19, wherein the step of storing the change bits further comprises: organizing the data store as an array having a plurality of columns and three rows, wherein the first row includes a series of first change bits, the second row includes a series of third change bits, and the third row includes a series of second change bits; and storing each of the first, second and third change bits for a frame in the corresponding row of the column of the array.

27. The method of claim 26, wherein the defined pattern of set bits over a set number columns is the second change bit, the second change bit, the first change bit, the first change bit, the second change bit, the third change bit, and the third change bit.

28. The method of claim 19, further comprising:
   identifying a location of the frame associated with the vertical cut; and
   altering the sequence of digital video images by adding or removing one or more frames at the location of the vertical cut.

29. The method of claim 20, further comprising, prior to the step of generating a changed frame: filtering out using a first mask small changes in motion in the current pixel bit relative to neighboring pixels when the current pixel bit is active; filtering out using a second mask small changes in motion in the delayed pixel bit relative to neighboring pixels when the delayed pixel bit is active; combining the current pixel bit and an inverted output of the second mask in a first AND gate; combining the delayed pixel bit and an inverted output of the first mask in a second AND gate; selecting either but not both of the outputs from the first and second AND gates.

30. A method for detecting a vertical cut in a sequence of digital video images using a digital signal processing computer, each digital video image having a plurality of pixels, each pixel having a plurality of bits containing chroma and luma values, the method comprising: filtering out common chroma and luma values between neighboring pixels in a source image to creating a filtered image; comparing each pixel in the filtered image to a threshold, and setting a single-bit current image to represent an active pixel when the threshold is met, indicating that the pixel contains detail, or clearing the single-bit current image to represent an inactive pixel when the threshold is not met; for each pixel, generating a single-bit delayed image from the current image, the single-bit having been either set to indicate an active pixel or reset in the step of comparing each pixel to a threshold; filtering out slight changes in motion from the current pixel bit when set as active and from the delayed pixel bit when set as active; for each pixel, generating a single-bit changed image that is set to indicate an active pixel when either but not both of the current image or the delayed image is set; counting the number of active pixels in the current image, the delayed image, and the changed image; for each pixel, comparing the count of active pixels in the current image to the count of active pixels in the delayed image; for each pixel, assigning a high weight to the count of the changed image when the counts of active pixels in the current image and delayed image are different, and assigning a low weight to the count of the changed image when the counts of active pixels in the current image and delayed image are different; adding the weighted counts of the changed image for all pixels to yield a weighted total changed pixel count; determining the percentage of change in the current image by dividing the weighted total changed pixel count by the larger of the count of active pixels in the current image or the count of active pixels in the delayed image; generating a one frame delay for the percentage of change in the current image which yields a percentage of change in the delayed image; selecting the larger percentage of change as a current image change value; generating a one frame delay for the current image change value to result in a delayed image change value; subtracting the delayed image change value from the current image change value to result in a change measurement value; comparing the change measurement value to a positive threshold and setting a single-bit POS signal when the positive threshold is met; comparing the change measurement value to a negative threshold and setting a single-bit NEG signal when the negative threshold is met; combining the POS signal and the NEG signal with a NAND gate to generate a NONE signal; registering each of the POS signal, the NEG signal and the NONE signal with a plurality of field delay elements to create an historical series of POS signals, NEG signals and NONE signals; and detecting a defined pattern in the series of POS signals, NEG signals and NONE signals, wherein the defined pattern indicates a vertical cut in the sequence of digital video images.

\* \* \* \* \*